Figure 1:
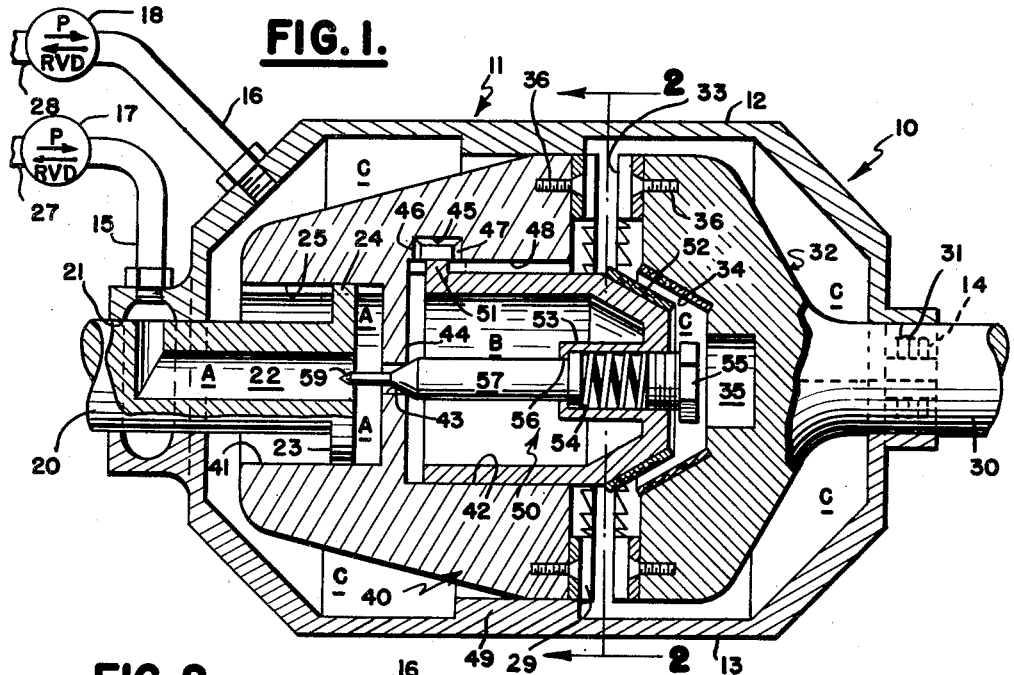

June 7, 1955  W. F. STAHL  2,710,086
SYNCHRONIZING CLUTCH
Filed Sept. 7, 1951

INVENTOR
WILLIAM F. STAHL
BY
ATTORNEY

# United States Patent Office 2,710,086
Patented June 7, 1955

2,710,086

SYNCHRONIZING CLUTCH

William F. Stahl, Upper Darby, Pa., assignor, by mesne assignments, to the United States of America as represented by the Secretary of the Navy Application September 7, 1951, Serial No. 245,438

8 Claims. (Cl. 192—53)

The present invention relates to the transmission of power and more particularly to a combination friction and jaw clutch operated by air pressure.

A principal object of the present invention is to provide a clutch of the type described that has a higher power and speed limit than prior clutches.

Another object is to provide such a clutch that will progressively bring the two shafts into perfect synchronization by friction means so that the jaw means may be properly engaged thereafter.

Figure 2:
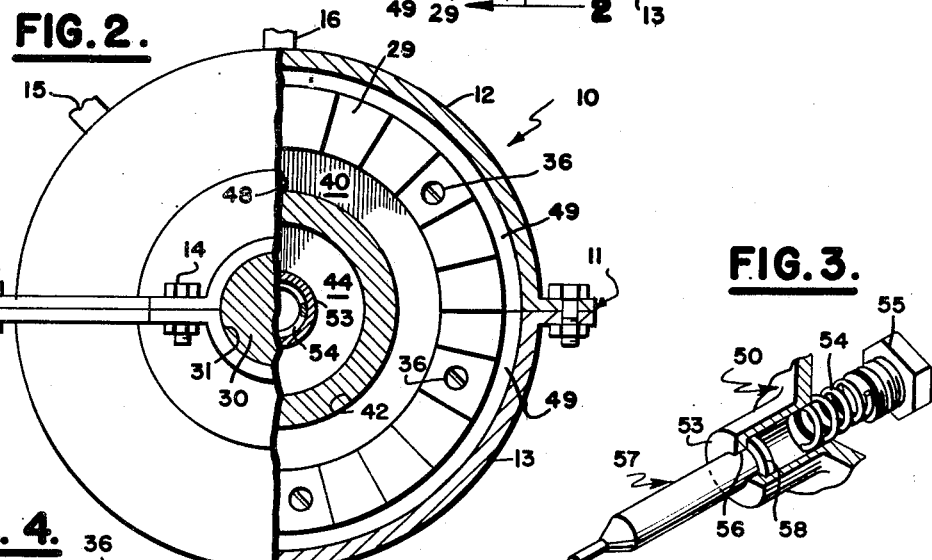
Figure 3:
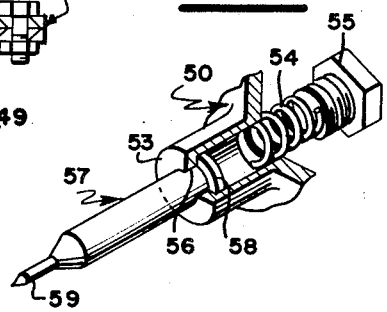
Figure 4:
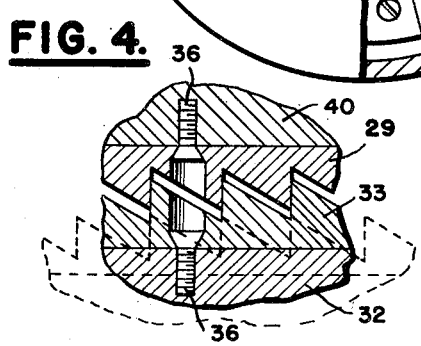

Other objects and advantages will more plainly appear from the detailed specification and drawings presented herein in exemplification but not in limitation of the present invention. Like reference characters represent like parts in the drawings which illustrate diagrammatically in:

Fig. 1 a longitudinal cross-section view of the clutch showing portions partly broken away;

Fig. 2 a transverse cross-sectional view taken on the line 2—2 in Fig. 1;

Fig. 3 a perspective view of the elements of the orifice valve;

Fig. 4 a longitudinal cross-sectional view of a detail of the jaws of the clutch of the present invention.

In Fig. 1 the clutch 10 comprises a housing 11, upper wall 12, lower wall 13 held together by fastening means as illustrated at 14 in Fig. 2. As shown in Fig. 1, housing 11 is provided with air inlet means 15 and 16 for the admission of air or gas to chambers A and C respectively, for example by variable delivery pumps or compressors as indicated at 17 and 18 in Fig. 1. Engaged by housing 11 are shafts 20 and 30; shaft 20 is provided with chamber A comprising channel 22 in communication with air inlet 15. Chamber A is provided with key way 25 for key 24 on piston member 23 on shaft 20, which piston 23 is arranged to slideably operate in recess 41 of chamber A in the forward portion of member 40. Shaft 20 operates in bore 21 in housing 11.

The rearward portion of sliding member 40 is provided with chamber B and the face portion of member 40 is provided with jaws 29 as shown in Figs. 1 and 4. Member 40 is arranged for sliding operation on inner cylinder 50 and is preferably suitably journalled by bearing 49 to assure stability, suitable air passages being provided therebetween. Inner cylinder 50 is provided with friction ring 52. Inner cylinder 50 is slideably mounted in chamber B of sliding member 40 by means of key 51 operating in key way 48 in member 40. Bypass 45 connects the forward portion of chamber B by inlet 46 to chamber C by inlet 47 and key way 48. Inner cylinder 50 is provided with centrally positioned spring housing 53 and coiled spring 54 bearing on valve 57 at one end and on spring nut 55 at the other end thereof. Spring nut 55 operates in seat 35, in face 32 of shaft 30. Valve 57 is slideably mounted in aperture 56 in housing 53 and is provided with tip guide 59 for guiding valve 57 into its seat 43 in wall 44 of member 40 separating chamber A from chamber B in member 40.

Tip guide 59 of valve 57 is arranged to project into channel 22 of chamber A. Shaft 30 operates in bore 31 in housing 11 and is provided at its inner face portion 32 with jaws 33 and friction ring 34. Friction ring 34 on face 32 of shaft 30 is adapted to engage friction ring 52 of inner cylinder 50 of shaft 20. Jaws 33 are adapted to engage jaws 29 as shown in Fig. 4. Jaws 29 and 33 are held in place by fastening means such as is shown at 36 in Figures 1, 2, and 4.

The length of the valve 57 is proportioned so that the valve is closed against the seat 43 where the members 40 and 50 are either both engaged or are in a disengaged position as hereinafter explained, and the position of the bypass 45 is positioned relative the key 51 so that the bypass is open in the same positions. Movement of the key 51 in either direction from the open position will close the bypass 45.

The size of the bypass 45 and the effective area of the valve seat 43 are both considerably smaller than the inlets 16 and 17, so that the pressures in chambers A and C may be changed much more rapidly than can the pressure in the chamber B.

The air pressure required to operate the clutch may be obtained in any convenient manner, such as the reversible variable delivery pumps indicated at 17 and 18. The construction and operation of the air pressure supply system is old and well-known, and is not per se part of the present invention.

It will be apparent that the area of the wall 44 adjoining chamber A is considerably smaller than the area of the same wall adjoining chamber B, and that the effective area of the inner piston 50 exposed to chamber B is approximately equal to the area thereof exposed to chamber C.

When the clutch is in a disengaged position, the pressures of chambers A and C are made approximately equal and at an intermediate pressure, with the bypass 45 open to interconnect chambers B and C. Since all the pressures are equal, the member 40 and the inner piston 50 remain longitudinally stationary. To engage the friction members 34 and 52, the pressure is reduced in chamber C, so that the unbalanced pressure in chamber B moves the inner piston 50 in the direction of the shaft 30, thus closing the bypass 45 and opening the valve 57 to chamber A. The pressure in chamber B may be increased by increasing the pressure in chamber A to increase the friction between the members 52 and 34 if desired.

When it is desired to engage the toothed clutch, the air pressure in chamber A is increased at a rate faster than the pressure can equalize itself through the valve seat 43, which creates a force against the wall 42 so as to move the member 40 toward the shaft 30. When the member 40 is as moved, the valve 57 is closed against the valve seat 43, and the bypass 45 is opened, so that the member 40 is maintained in an engaged position by the pressure in chamber A, the pressures in chambers B and C equalizing themselves.

It will be noted that inner piston 50 remains in an engaged position but without physical pressure between the members 34 and 52, since the pressure of chambers B and C equalize themselves through the bypass 45. The pressure in chamber C may now be increased to its starting pressure since the pressure in chamber A has been increased above its starting pressure.

The clutch remains in its driving or engaged position so long as the pressures in chambers A and C remain unchanged. If, however, the pressure in chamber A is reduced below its starting pressure, the pressure in chamber B forces the member 40 out of engagement with member 32, the pressure in chamber B being unable to change because the valve 57 is closed against the seat 43. As the member 40 moves out of engagement, the bypass 45 is closed and the valve 57 is opened, so that the air pressure differential between chambers A and B is allowed to equalize through the valve seat 43. As the pressure within the chamber B decreases the pressure in chamber C forces the inner piston into its original position. Thereafter, the pressures in the several chambers may be equalized at the starting pressure.

As only preferred embodiments are revealed, various modifications of the present invention are contemplated and may obviously be resorted to by those skilled in the art without departing from the spirit and scope of the appended claims wherein it is claimed:

1. A clutch comprising in combination: a first shaft; a second shaft; a housing sealing the adjacent ends of said shafts in a first sealed chamber; a second chamber in said first shaft; a first sliding member on said first shaft; a second sliding member in said first sliding member; a third chamber in said second sliding member; a first friction face on said second sliding member; a second friction face on said second shaft; and means for applying air pressure in said chambers whereby said first and second friction faces are engaged with each other.

2. A clutch, comprising a first shaft and a second shaft; a housing sealing adjacent ends of said shafts in a first chamber; a second chamber in said first shaft; a first sliding member on said first shaft; a second sliding member in said first sliding member; a third chamber in said second sliding member; clutch faces on said first and second sliding members; opposite clutch faces on said driven shaft; and means for applying varying air pressures to said chambers whereby said clutch faces on said second sliding members are progressively engaged with the opposite clutch faces on said driven shaft.

3. A clutch comprising a driving shaft and a driven shaft; a housing sealing the adjacent ends of said shafts in a first chamber; a first sliding member in said drive shaft; a second chamber in said first sliding member; a second sliding member in said first sliding member; a third chamber in said second sliding member; pressure control valve means in said third chamber; clutch faces on said sliding members; opposite clutch faces on said driven shaft; and means for varying the air pressures in said chambers whereby said clutch faces are progressively engaged with said opposite clutch faces on said driven shaft.

4. A clutch comprising in combination a driving shaft and a driven shaft; a housing enclosing the adjacent ends of said shafts in a first chamber; a second chamber in said driving shaft; a first sliding member on said driving shaft; a second sliding member in said first sliding member; a third chamber in said second sliding member; valve means in said third chamber; a friction ring on said second sliding member; an opposing friction ring on said driven shaft; first driving jaws on said first sliding member; second driving jaws on said driven shaft; and means for varying the fluid pressure in said chambers whereby said friction rings are engaged prior to the subsequent inter-engagement of said jaws.

5. The combination of claim 4 that includes bypass means between said second and third chambers.

6. The combination of claim 4 that includes spring actuating means for said valve means.

7. The combination of claim 4 that includes variable delivery pump means for said fluid pressure varying means.

8. A pneumatically operated clutch comprising a driving and driven shaft in axial alignment with each other, a fixed clutch member attached to one of said shafts including a first toothed ring and a first friction member, the other of said shafts containing a first bore therein, a slidable clutch member comprising a body containing a second bore, and a third bore having a diameter larger than the diameter of said second bore coaxial with said first bore, and an apertured wall therebetween, a second toothed ring secured to said slidable clutch member adapted to mate with said first toothed ring on said fixed clutch member, said shaft containing said first bore being slidably and non-rotatably secured to said slidable clutch member in said second bore, a piston slidably and non-rotatably secured to said slidable clutch member in said third bore, a second friction member secured to said piston mating with first friction member, first valve means operatively interconnecting said apertured wall and said piston adapted to close when said piston fully enters said third bore, second valve means operable by said piston to bypass said piston when said piston is in a mid-position, a housing surrounding said slidable and fixed clutch members, and means for applying pneumatic pressure to said housing and to said first bore, whereby to engage first said friction members and later said toothed rings and to disengage said friction and toothed clutches.

References Cited in the file of this patent

UNITED STATES PATENTS

| | | |
|---|---|---|
| 1,024,595 | Noyes | Apr. 30, 1912 |

FOREIGN PATENTS

| | | |
|---|---|---|
| 564,638 | Great Britain | Oct. 6, 1944 |
| 606,678 | Great Britain | Aug. 18, 1948 |